United States Patent [19]

Zankman

[11] 4,402,249

[45] Sep. 6, 1983

[54] HARMONICA MUSIC HOLDER AND LEARNING SYSTEM

[76] Inventor: Alvin M. Zankman, 1316 Titania La., McLean, Va. 22101

[21] Appl. No.: 278,383

[22] Filed: Jun. 29, 1981

[51] Int. Cl.³ ............................................. G10D 9/00
[52] U.S. Cl. ....................................... 84/453; 84/377; 248/441 C; 248/443
[58] Field of Search .................................. 84/377–379, 84/329, 453, 477 R, 483 R; 248/441 B, 441 C, 443

[56] References Cited

U.S. PATENT DOCUMENTS

| | | |
|---|---|---|
| 1,535,206 | 4/1925 | Davidson . |
| 1,573,242 | 2/1926 | Hand ..................................... 84/377 |
| 1,722,852 | 7/1929 | Miller . |
| 1,797,613 | 3/1931 | Peterson ............................... 84/377 |
| 2,655,830 | 10/1953 | Balint .................................... 84/377 |
| 2,811,070 | 10/1957 | Fitzgerald ............................. 84/378 |
| 3,589,232 | 6/1971 | Peters . |

*Primary Examiner*—Lawrence R. Franklin
*Attorney, Agent, or Firm*—Lowe, King, Price & Becker

[57] ABSTRACT

An educational device (10) for teaching proper harmonica (1) playing techniques includes a rectangular holder (20) defining a longitudinal receiving slot (25). An elongated support arm (28) projects outwardly from the holder (20) and includes an interference fitting clip (30) adapted to secure the holder (20) to a harmonica (1) and to locate the receiving slot (25) in a vertical plane. The receiving slot (25) carries special sheet music (15) having a two-dimensional matrix printed thereon. The sheet music (15) faces the harmonica player and includes numbered matrix columns (16) aligned with corresponding numbered blow holes (4) in the harmonica (1). A plurality of music numbers are printed in corresponding matrix columns (16) for alignment with the blow holes (4) referring the harmonica player to a designated blow hole (4) to produce a desired note. A symbol printed adjacent each number informs the player whether to blow or draw through the numbered blow holes (4) to play chords or songs designated by the numbers printed in consecutive matrix rows (18).

11 Claims, 6 Drawing Figures

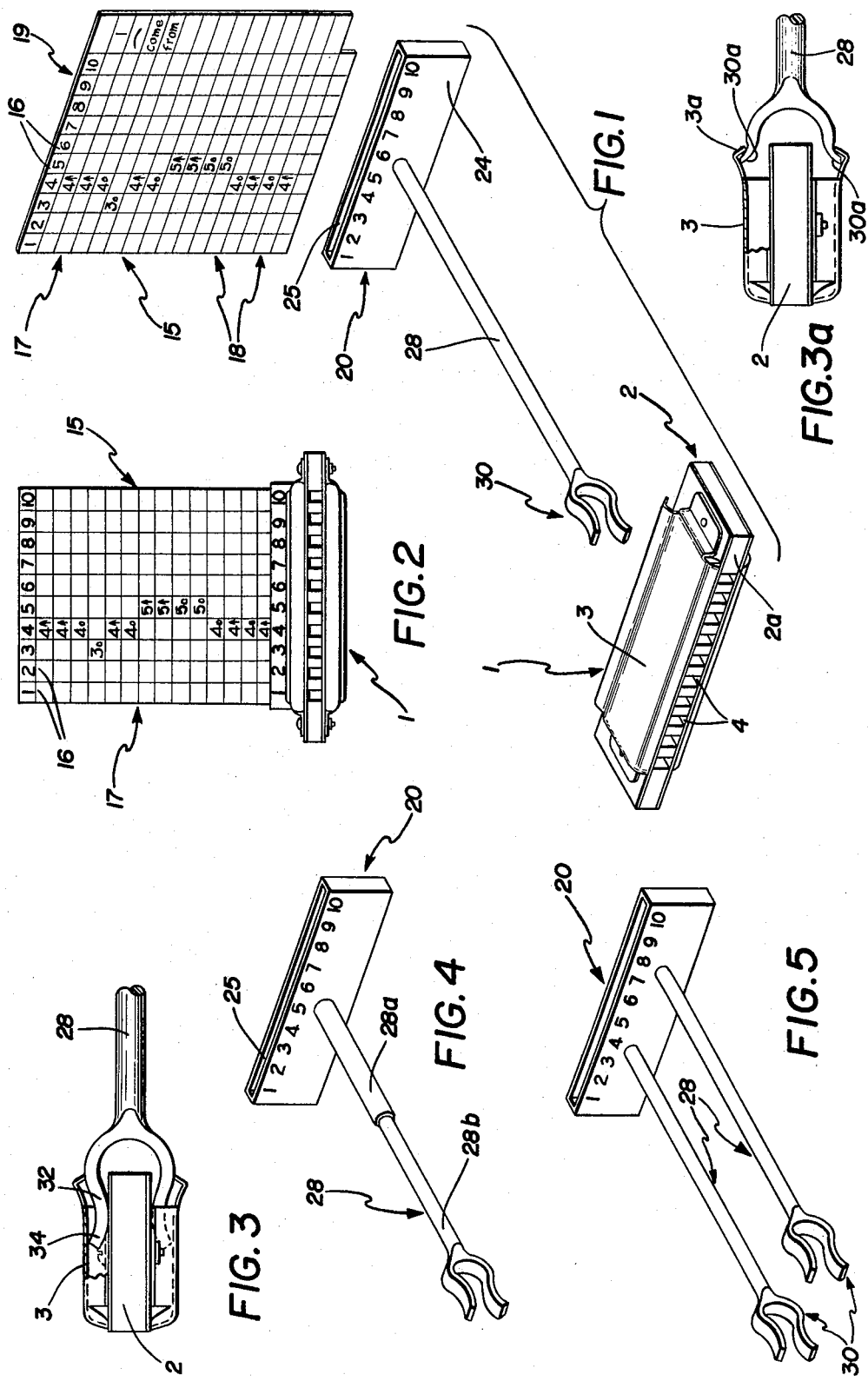

HARMONICA MUSIC HOLDER AND LEARNING SYSTEM

TECHNICAL FIELD

This invention relates generally to sheet music holders for musical instruments, and more particularly to a sheet music holder enabling rapid learning of harmonica playing.

BACKGROUND ART

Harmonicas are small rectangular wind instruments which include a plurality of free metallic reeds recessed in adjacent air slots formed transversely within the harmonica body. Numbered blow holes formed along one edge of the harmonica body separately communicate with the slots. Alternate tones of the scale are sounded by exhaling or inhaling through the various numbered blow holes to produce single notes or chords. Each blow hole of the harmonica can produce two notes, depending on whether the harmonica player blows (exhales) or draws (inhales) relative to the hole.

Harmonicas have proven to be extremely popular and versatile. Because harmonicas are small and relatively simple in structure, they are portable and inexpensive. Consequently, children and other beginning music enthusiasts are often exposed to music through toy or inexpensive harmonicas.

Standard notations in harmonica music include reference numbers informing the harmonica player which hole to operate; additional symbols, such as upwardly or downwardly directed arrows, designate whether blowing or drawing is required to produce a desired note. A sequence of numbers and arrows printed in music books enables harmonica players to identify the proper sequence of numbered blow holes to play a song.

It is often difficult for beginning harmonica players, especially young children, to accurately associate a number printed in a song book with a corresponding numbered blow hole since the harmonica rests gently between the teeth and lips during proper play. Additionally, playing the harmonica from a song book generally requires supporting the same with music stands and other large or expensive supporting equipment. Song books further require constant attention; slight head movement away from the book or momentary distractions can cause the player to lose the proper blow hole sequence necessary to play the song.

It is accordingly an object of the present invention to provide an educational device that attaches to the harmonica carrying special sheet music to allow the player to accurately associate a sequence of reference numerals printed on the sheet with corresponding, numbered blow holes on the harmonica.

Another object of the invention is to provide an educational device which enables quick and easy harmonica instruction.

Yet another object is to provide an educational device capable of positioning sheet music outwardly from the harmonica player to enable improved visual observation of the numbered song sequence.

Still a further object is to provide an educational device that is inexpensive and portable.

DISCLOSURE OF INVENTION

An educational device for use in harmonica playing, according to the present invention, comprises sheet music having matrix of rows and columns printed thereon. The number of matrix columns is an alignment with numbered or unnumbered blow holes on the harmonica. Reference music numbers printed in a matrix column are aligned with corresponding numbered blow holes to facilitate accurate positioning of the mouth on the proper blow holes to produce desired notes. Symbols printed adjacent each music number inform the player whether to blow or draw through the designated blow hole. Music numbers printed in consecutive matrix rows allow the player to play a desired pattern of chords or song.

Retaining means is provided for positioning the sheet music in front of the harmonica player to provide improved visual observation and alignment of the matrix columns with the harmonica blow holes. Such retaining means preferably includes a holder defining a longitudinal receiving slot located transversely to the harmonica body. The bottom portion of the sheet music is retained in the receiving slot to allow the matrix to face the harmonica player.

An elongated support arm attached to the holder has an attachment clip adapted to releasably secure the support arm and holder to the harmonica.

Still other objects and advantages of the present invention will become readily apparent to those skilled in this art from the following detailed description, wherein I have shown and described only the preferred embodiments of the invention simply by way of illustration of the best mode contemplated by me of carrying out my invention. As will be realized, the invention is capable of modifications in various respects, all without departing from the invention. Accordingly, the drawings and description are to be regarded as illustrative in nature, and not as restrictive.

BRIEF DESCRIPTION OF DRAWING

FIG. 1 is a perspective view of an educational device in accordance with the present invention, showing the position of the music sheet in the holder relative to the harmonica;

FIG. 2 is a front plan view of the device of FIG. 1, showing alignment of the matrix columns with the harmonica blow holes;

FIGS. 3 and 3a are partial, side plan views of different embodiments of the attachment clip for securing the holder and music sheet to rear portions of the harmonica;

FIG. 4 is a perspective view of a second embodiment of the invention, showing the use of a telescopic support arm to adjust the distance of the music sheet from the harmonica; and FIG. 5 is another embodiment of the present invention, showing a pair of parallel support arms for supporting the music sheet.

BEST MODE FOR CARRYING OUT THE INVENTION

Referring to FIG. 1, an educational device of the invention, generally designated by reference numeral 10, attaches to a harmonica 1 as a teaching aid to students. Harmonica 1 is a small rectangular, hand-held wind instrument having an elongated flat body 2 and a surrounding cover 3. A plurality of free metallic reeds are recessed in adjacent air slots (not shown) extending transversely through body 2. Each air slot separately communicates with a unique blow hole 4 of a series that are spaced apart from each other along edge 2a of harmonica body 2. Alternate tones of the scale are sounded by the player exhaling or inhaling through blow holes 4 (hereinafter referred to as "blowing" or "drawing", respectively) to produce single notes or chords depending on the number of blow holes covered by the mouth or tongue. Ten blow holes 4 are provided in most diatonic harmonicas, and are usually consecutively printed on cover 3 (see FIG. 1). These numbers correspond with reference numbers provided in introductory level music books.

To facilitate accurate, uninterrupted mouth positioning on blow holes 4, sheet music 15 is positioned on a holder 20 outwardly from harmonica 1. As shown in FIG. 1, sheet music 15 of the invention is a rectangular, semi-rigid sheet positioned upright in holder 20 when a bottom portion thereof is retained in receiving slot 25 provided in the holder. A two-dimensional matrix having a plurality of vertical columns 16 is printed on the sheet music 15. As best shown in FIG. 2, the number of vertical columns 16 are aligned with corresponding blow holes 4 when sheet 15 is retained in holder 20.

Guide numerals 1-10 are printed consecutively in columns 16 of the top row 17 of sheet music 15. These guide numerals are in corresponding alignment with numbered or unnumbered blow holes 4 to refer the harmonica player to the desired blow hole, as discussed infra. The remaining matrix rows, generally designated as 18, include music reference numbers printed in corresponding numbered columns 16 in alignment with the corresponding blow holes. Such positioning of the music numbers in alignment with blow holes 4 advantageously serves to refer the player to the correct blow hole to produce the desired sound by providing for simultaneous visual observation and mouth alignment of the music number with the selected blow hole. Removal of the mouth from the harmonica is advantageously avoided to allow for uninterrupted play. One of symbols "0" or " ↑ " printed adjacent each music number informs the player whether to blow or draw through the selected blow hole to produce a desired note or chord.

As discussed supra, sheet music 15 is positioned by holder 20 in front of harmonica 1 and the harmonica player. As shown in FIG. 1, holder 20 is generally a flat, rectangular member having a receiving slot 25. Receiving slot 25 extends through an imaginary, central longitudinal plane of holder 20 which is parallel to flat outer surface 24. The receiving slot 25 has a length sufficient to receive the bottom portion of sheet music 15; the sheet music 15 is retained in the receiving slot 25 by friction between the slot walls and the sheet music to expose the matrix to the harmonica player. One of the flat surfaces 24 faces the harmonica 1 and the harmonica player and has printed thereon numerals 1-10 in corresponding alignment with blow holes 4 and the numerals printed in top matrix row 17.

Elongated support arm 28 projects outwardly from flat surface 24 for spacing holder 20 and sheet music 15 from harmonica 1. Attachment clip 30 is provided on the free end of support arm 28 located outwardly from holder 20. As best shown in FIG. 3, attachment clip 30 includes oppositely curved portions 32, 34 which allow the attachment clip to engage rear portions of harmonica 1 located between body 2 and cover 3 in interference and snap fitting engagement. Secure attachment of sheet music 15 and holder 20 to harmonica 1 provided with attachment clip 30 enables convenient, visible positioning of the music numbers in corresponding alignment with blow holes 4, thereby providing simultaneous association between the music number and the correct blow hole for producing the desired chord sequence.

In accordance with the invention, sheet music 15 (including the matrix columns printed thereon) and holder 20 have corresponding dimensions for proper alignment with each of blow holes 4. Since the blow holes 4 are spaced apart from each other along edge 2a of the harmonica, the length of holder 20 is approximately equal to the harmonica length. Each of the matrix rows 18 includes one or more music numbers (see FIGS. 1 and 2); subsequent music numbers presented in consecutive top or bottom justified matrix rows allow the harmonica player to play a desired song or chord arrangement through progressive observation of each consecutive row. Support arm 28 spaces sheet music 15 at an optimal sighting distance of approximately nine inches from the harmonica player.

FIG. 4 shows a second embodiment of the invention, wherein support arm 28 is a telescoping arm to provide adjustable spacing between the harmonica player and sheet music 15. Support arm 28 includes shaft portions 28a, 28b; hollow shaft portion 28a projects outwardly from holder 20 and has an inner diameter slightly greater than the outer diameter of shaft portion 28b which carries attachment clip 30. Shaft portion 28b is mounted in concentric, sliding engagement within shaft portion 28a to accommodate individual user sight requirements.

Alternative to providing telescopic support arm 28, holder 20 can include a bore (not shown) extending transverse through the holder. One end of arm 28 is received in the bore to allow for adjustable spacing of the holder relative to harmonica 1.

FIG. 5 shows a third embodiment of the invention, in which educational device 10 includes a pair of corresponding parallel support arms 28 for improved stability projecting outwardly from holder 20. Attachment clips 30 are formed at the free ends of support arms 28. The provision of dual support arms 28 is particularly useful with chromatic type harmonicas which are considerably longer than diatonic harmonicas normally used by beginners. Of course, dual support arms 28 can be extensible, as discussed, supra.

An additional column 19 can be provided on sheet music 15 adjacent matrix columns 16. This arrangement advantageously allows for printing the words of the song adjacent the corresponding music reference numbers, enabling the harmonica player to see what is played. A symbol "—" informs the player to use the next note with the same word (see FIG. 1).

In a different embodiment, shown in FIG. 3a, attachment clip 30 includes flange portions 30a located to engage corresponding marginal lip portions 3a on cover 3 to secure arm 28 to harmonica 1.

In this disclosure, there are shown and described only the preferred embodiments of the invention, but, as aforementioned, it is to be understood that the invention is capable of changes or modifications within the scope of the inventive concept as expressed herein. For example, apart from use with hand-held harmonicas, educational device 10 of the invention can also be applied for use with other instruments having actuating keys, holes, and the like, which are capable of visual alignment with numerals, symbols or like identifying means. Additionally, although holder 20, support arm 28 and attachment clip 30 are illustrated as being integrally formed from plastic or like materials, these elements can be separately formed and assembled by any standard means. In addition, although sheet music 15 is described as being formed from semi-rigid material, such as cardboard, other printing mediums which are flexible or incapable of supporting their own weight can also be used in the present invention. In this case, a pair of elongated, U-shaped support tracks (not shown) can be provided to support sheet music 15 in upright position within receiving slot 25. The support tracks can project upwardly from opposite ends of holder 20. It will, of course, be understood that other identifying means correctly located in the columns 16 can be used in place of the music numbers. Other symbols can also be used.

I claim:

1. An educational device for instructing harmonica playing, comprising:
   (a) a music sheet having a matrix printed thereon, said matrix columns aligned with harmonica blow holes, said music sheet including blow hole identifying means printed in the matrix for enabling a harmonica player to correctly identify said holes and position the player's mouth directly thereon for blowing or drawing to produce a desired pattern of notes on the harmonica, said identifying means being a series of numbers respectively located within at least one matrix column so that the numbers are vertically aligned with their corresponding blow holes;
   said numbers respectively representing musical notes collectively defining a musical sequence, to enable said harmonica player to play said sequence by positioning and repositioning said player's mouth to physically contact and cover said blow holes in alignment with numbers being consecutively scanned in the matrix;
   said identifying means further including symbols printed adjacent the numbers informing the player whether to blow or draw through the blow holes to produce desired chords or notes;
   (b) retaining means for positioning the music sheet in a stationary position away from the harmonica and player to enable visual observation of the numbers and
   (c) fastening means interconnecting the retaining means to the harmonica.

2. An educational device according to claim 1, wherein said matrix includes an upper row having a guide number printed in each of said matrix columns, said number in corresponding alignment with said blow hole thereby enabling rapid and accurate placement of the player's mouth on the blow hole in alignment with the music number.

3. The device of claim 1, wherein said matrix further includes an additional column allowing for printing words of the song in rows corresponding to said music number.

4. An educational device according to claim 3, wherein said retaining means includes an elongated substantially rectangular holder having a longitudinal receiving slot defined therein, said receiving slot retaining the sheet music to enable visual observation of the matrix.

5. An educational device according to claim 4, wherein said retaining means further includes a support arm spacing the sheet music and holder away from the harmonica, said support arm connecting the holder to the fastening means.

6. An educational device according to claim 4, wherein said fastening means includes an attachment clip securely engaging interior surface portions of the harmonica.

7. An educational device according to claim 6, wherein said attachment clip includes means for providing resilient interference fitting engagement between a body and interior surface of a cover of the harmonica.

8. An educational device according to claim 7, wherein said support arm is telescopically adjustable to selectively position the holder and sheet music at a desired distance from the player.

9. The device of claim 6, wherein said attachment clip includes curved flange portions for securing the device to a corresponding lip on a harmonica cover.

10. An educational device according to claim 4, wherein said holder includes a plurality of numbers printed thereon in corresponding alignment with said blow holes.

11. An educational device for instructing harmonica playing, comprising:
    (a) a harmonica having a plurality of numbered blowholes;
    (b) a music sheet adapted to be positioned facing a harmonica player during play, said music sheet including a plurality of reference numbers respectively representing musical notes collectively defining a musical sequence, each said number corresponding in value to various ones of the numbered blowholes and being printed in vertical columns in alignment with their corresponding blowholes to facilitate accurate positioning and repositioning of the player's mouth to physically contact and cover proper blowholes to produce a desired sequence of notes by visually and consecutively scanning the reference numbers and moving the mouth into position covering correspondingly numbered, aligned blowholes, and further including symbols printed adjacent some of said numbers informing the player whether to blow or draw through the blowholes played to produce desired chords or notes;
    (c) means for holding the music sheet in a stationary position away from the harmonica, enabling visual observation of the reference numbers, said means including consecutive numbers facing the player and aligned with corresponding blowholes below said reference numbers; and
    (d) means interconnecting the holding means and the harmonica.

* * * * *